United States Patent [19]

Geka

[11] Patent Number: 4,687,345
[45] Date of Patent: Aug. 18, 1987

[54] LINEAR MOTION ROLLER BEARING ASSEMBLY HAVING A ROLLER SEPARATOR

[75] Inventor: Toshiaki Geka, Funabashi, Japan

[73] Assignee: Nippon Thompson Co., Ltd., Tokyo, Japan

[21] Appl. No.: 885,044

[22] Filed: Jul. 14, 1986

[30] Foreign Application Priority Data

Jul. 16, 1985 [JP] Japan ................................. 60-155038

[51] Int. Cl.$^4$ ............................................. F16C 29/06
[52] U.S. Cl. ...................................... 384/44; 384/47
[58] Field of Search ....................... 384/44, 47, 447, 43

[56] References Cited

U.S. PATENT DOCUMENTS 3,275,391  9/1966  Blais ....................................... 384/447
3,960,413  6/1976  Abbuhl et al. ......................... 384/47
4,547,023  10/1985 Blatter ................................... 384/44
4,583,793  4/1986  Blatter ................................... 384/447

Primary Examiner—Lenard A. Footland

Attorney, Agent, or Firm—Alan H. MacPherson; Richard Franklin; Thomas S. MacDonald

[57] ABSTRACT

A crossed roller type linear motion rolling contact bearing assembly includes a straight rail and a slider mounted on the rail slidably therealong. An endless circulating path is defined in the slider, in which a plurality of rollers are provided. Since the path includes a load section where the rollers provide a rolling contact between the slider and the rail, the slider may slidably move along the rail. Also provided in the endless path are a plurality of roller separators each of which is interposed between two adjacent rollers thereby keeping these two rollers as spaced apart from each other at all times. The separator has a pair of roller-receiving recesses for holding therein the associated rollers in a crossed arrangement, and each of the roller-receiving recesses is so shaped that the roller received therein can change its orientation over a predetermined range so as to maintain a predetermined positional relationship between the two rollers received in the recesses on both sides of the separator.

6 Claims, 15 Drawing Figures

LINEAR MOTION ROLLER BEARING ASSEMBLY HAVING A ROLLER SEPARATOR

BACKGROUND OF THE INVENTION

1. Field of the Invention

This invention relates to a linear motion rolling contact bearing assembly, and, in particular, to a crossed roller linear motion rolling contact bearing assembly having a roller separator for separating the two adjacent rollers.

2. Description of the Prior Art

A linear motion rolling contact bearing assembly includes a straight rail and a slider which moves along the rail. An endless circulating path is defined in the bearing assembly, in which a plurality of rollers are provided thereby providing a rolling contact between the rail and the slider. The endless path includes a load section defined between the rail and the slider, whereby the rollers roll between the rail and the slider, a return section and a pair of connecting sections connecting the corresponding ends of the load and return sections. The rollers are typically provided in the endless path in a crossed arrangement, i.e., the adjacent two rollers being oriented with their longitudinal axes extending perpendicular to each other. Such a linear motion rolling contact bearing assembly is advantageous in that it can provide theoretically an unlimited length of relative motion between the rail and the slider.

In such a linear motion rolling contact bearing assembly, a plurality of roller separators are often provided in the endless path, each sandwiched between the two adjacent rollers, so as to reduce friction and wear of the rollers due to direct contact between the two adjacent rollers and to guide the movement of the rollers, thereby preventing the rollers from being skewed. However, with the provision of such roller separators, when the rollers move between the load or return section and the connecting section, the center-to-center distance between the two adjacent rollers varies, and, thus, a gap in the circumferential direction varies to increase the sliding resistance of the bearing assembly. As disclosed in Japanese Patent Application No. 59-38871, each of the roller separators may be provided with an elastic portion so as to absorb the fluctuations of the gap in the circumferential direction. This approach is not entirely satisfactory and there has been a need to develop a novel roller separator which can further reduce the sliding resistance of the linear motion rolling contact bearing assembly.

SUMMARY OF THE INVENTION

It is therefore a primary object of the present invention to obviate the disadvantages of the prior art as described above and to provide an improved linear motion rolling contact bearing assembly having a reduced sliding resistance.

Another object of the present invention is to provide an improved crossed roller type linear motion rolling contact bearing assembly which insures a smooth movement of rollers throughout an endless circulating path.

A further object of the present invention is to provide an improved crossed roller type linear motion rolling contact bearing assembly which maintains rollers equidistance at all times when they roll along a curved connecting section of an endless circulating path.

A still further object of the present invention is to provide an improved crossed roller type linear motion bearing assembly having a plurality of roller separators each of which is interposed between the two adjacent rollers, thereby guiding the movement of the rollers along a predetermined circulating path.

A still further object of the present invention is to provide an improved crossed roller type linear motion bearing assembly high and accurate in performance and suitable for fast operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
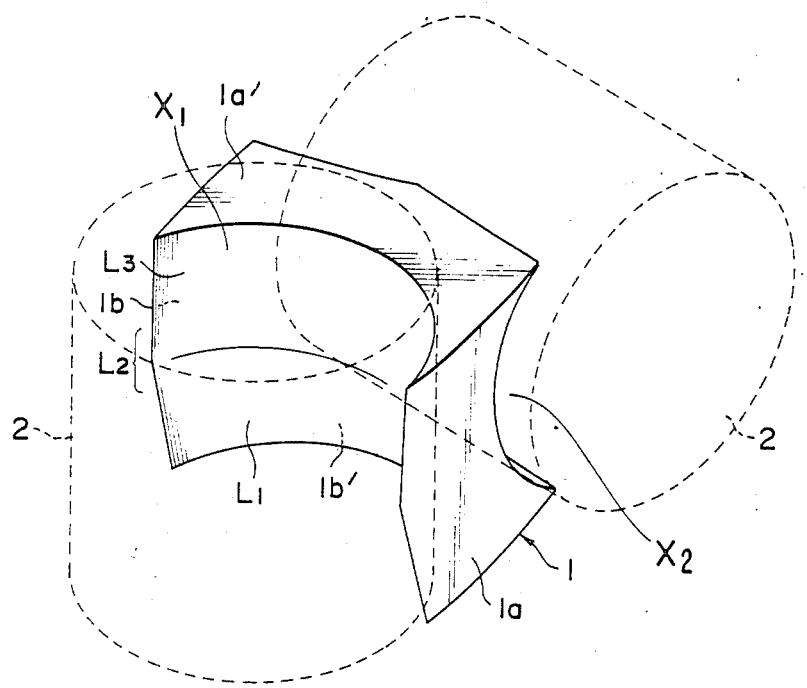
FIG. 1 is a schematic illustration in perspective view showing a separator construed in accordance with one embodiment of the present invention as interposed between the two adjacent rollers in a crossed arrangement.

Referring now to FIG. 1, there is schematically shown in perspective a roller separator 1 constructed in accordance with one embodiment of the present invention for use in a crossed roller type linear motion rolling contact bearing assembly. As shown, the roller separator 1 is provided as interposed between two adjacent rollers 2 and 2 which are provided in a crossed arrangement, i.e., the two rollers 2 and 2 being oriented with their longitudinal or rotating axes extending perpendicular to each other and also to the direction of movement along a predetermined endless circulating path. The separator 1 has a pair of roller receiving recesses $X_1$ and $X_2$ on opposite sides thereof, a pair of curved end surfaces $1a$ and $1a'$ and a pair of flat end surfaces $1b$ and $1b'$. The curved end surfaces $1a$ and $1a'$ are adjacent to each other and they are opposite to the flat end surfaces $1b$ and $1b'$, respectively. As will become clear later, the separator 1 is so disposed that the curved end surfaces 1a and 1a' slide along an outer side surface of a connecting section of an endless circulating path and the flat end surfaces 1b and 1b' slide along an inner side surface thereof. Each of the curved end surfaces 1a and 1a' preferably has a spherically curved end surface.

Each of the roller-receiving recesses $X_1$ and $X_2$ has a generally semi-cylindrical shape. In the illustrated embodiment, each of the roller-receiving recesses $X_1$ and $X_2$ has three sections: a straight section L3 for holding the corresponding roller 2 when the roller 2 is in a straight path section of an endless circulating path, an inclined section L1 for holding the corresponding roller 2 when the roller 2 is in a curved path section having the smallest radius curvature of the endless circulating path, and an intermediate section L2 for holding the corresponding roller 2 when the roller 2 is in an intermediate section between the straight path section and the curved path section having the smallest radius of curvature. For example, in the case where the endless circulating path includes a straight load section, a straight return section, and a pair of curved connecting sections, each having a fixed radius of curvature and having both ends connected to the corresponding ends of the straight load and return sections, the rollers 2 are held by the straight section L3 while the rollers 2 are in the straight load and return sections and they are held by the inclined section L1 while the rollers 2 are in the curved connecting sections; whereas, the rollers 2 are held by the intermediate section L2 when the rollers 2 move between the straight and curved sections. It is to be noted that the roller-receiving recess $X_1$ extends perpendicular to the other roller-receiving recess $X_2$ on the opposite side, so that the two adjacent rollers 2 and 2 may be maintained in a crossed arrangement and spaced apart from each other over a predetermined distance when received in the respective roller-receiving recesses $X_1$ and $X_2$.

Figure 2:
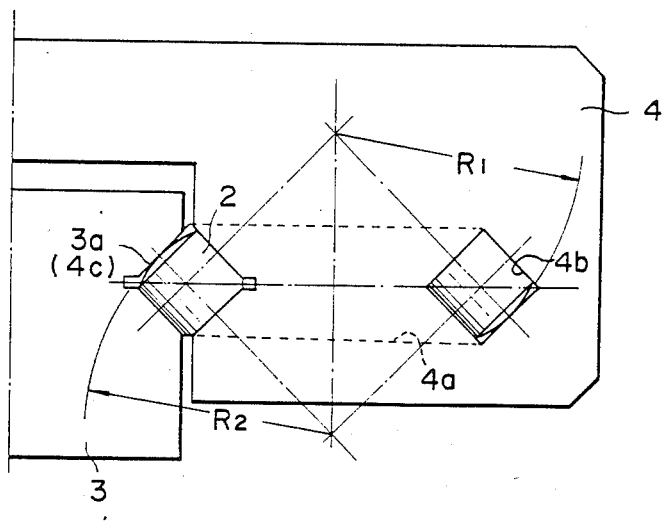
FIG. 2 is a schematic illustration showing part of a crossed roller type linear motion rolling contact bearing assembly constructed in accordance with one embodiment of the present invention.

FIG. 2 shows part of a crossed roller type linear motion rolling contact bearing assembly constructed in accordance with one embodiment of the present invention. As shown, the bearing assembly includes a rail 3, which extends straight in the direction perpendicular to the sheet of the drawing over a desired length, and a slider 4 which is generally in the shape of inverted "U" and is mounted on the rail 3 in a straddling fashion. It is to be noted that since the present bearing assembly is symmetrical in structure with respect to the longitudinal centerline of the rail 3, only the right half portion of the assembly is shown schematically in FIG. 2. The rail 3 has a vertical side surface in which a V-shaped guide groove 3a is formed as extending straight in parallel with the longitudinal centerline of the rail 3. The slider 4 has a leg portion which extends downwardly from its horizontal portion and the leg portion is located adjacent to the side surface of the rail 3. The leg portion of the slider 4 has an inner side surface opposite to and separated away over a predetermined gap from the side surface of the rail 3. The inner side surface of this leg portion is also provided with a V-shaped guide groove in parallel with and opposite to the V-shaped guide groove 3a of the rail 3. These oppositely faced pair of V-shaped guide grooves define a straight load section 4c of an endless circulating path defined in the leg portion of the slider 4.

The leg portion of the slider 4 is also formed with a straight return section 4b which is in the shape of a channel and extends in parallel with the straight load section 4c. This straight return section 4b also forms part of the endless circulating path, the remaining part of which is comprised of a pair of curved, connecting sections 4a, 4a, connecting the corresponding ends of the straight load and return sections 4c and 4b. In the illustrated embodiment, the endless circulating path is so formed that it has a common diagonal line. That is, as shown in FIG. 2, the diagonal lines extending between the horizontal apexes of the load and return sections define a common diagonal plane, as indicated by the one-dotted line. The outer guide surface of the curved, connecting section 4a is also V-shaped and the upper half of this outer guide surface defines part of a conical surface. In the illustrated embodiment, since the curved, connecting section 4a is defined by a fixed radius, which corresponds to half of the distance between the center of the load section 4c and the center of the return 4b in the horizontal direction, $R_1 = R_2$. It is to be noted that either of the curved end surfaces 1a and 1a' of the separator 1 should have a radius of curvature which is equal to or less than the radius of curvature $R_1$ ($R_2$).

In the endless circulating path, there are provided a plurality of rollers 2 each having AF end surfaces, i.e., one end surface of the roller 2 being curved or spherical and the other end surface being flat. The rollers 2 are arranged as being crossed alternately so that any two adjacent rollers 2 are oriented with their longitudinal or rolling axes extending perpendicular to each other and also to the direction of movement along the endless circulating path. Also provided in the endless circulating path is a plurality of separators 1 each of which is arranged as interposed between the two adjacent rollers 2 and 2 in a crossed arrangement. Thus, the rollers 2 and the separators 1 are arranged in the endless circulating path in the manner as shown in FIG. 1.

Figure 3A:
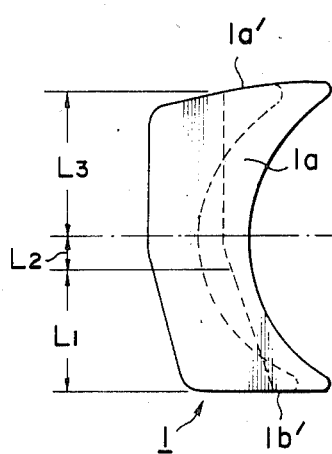
FIG. 3a is a front view showing the roller separator 1 for use in the crossed roller type linear motion rolling contact bearing assembly of FIG. 2.
Figure 3C:
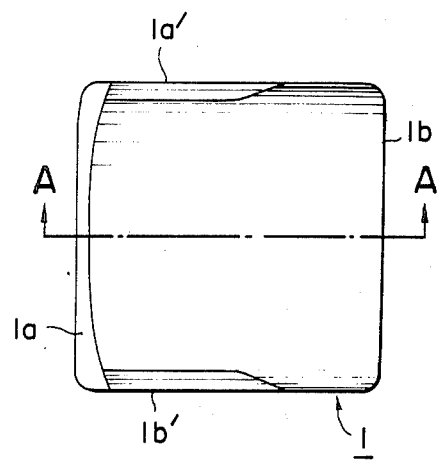
FIG. 3c is a plan view showing the roller separator 1 of FIGS. 3a and 3b.
Figure 3B:
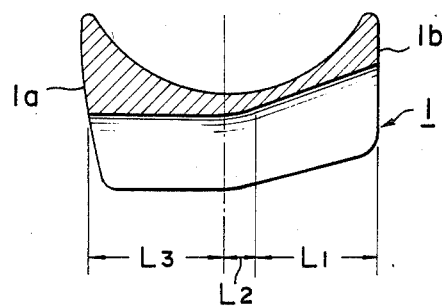
FIG. 3b is a cross-sectional view of the roller separator 1 shown in FIG. 3a taken along line A—A indicated in FIG. 3c.

FIGS. 3a through 3b show in detail the structure of the roller separator 1 employed in the linear motion rolling contact bearing assembly of FIG. 2. The roller separator 1 shown in FIGS. 3a through 3c is identical to the roller separator 1 shown in FIG. 1. Thus, it is clear that the roller separator 1 is provided with a pair of roller-receiving recesses $X_1$ and $X_2$ on opposite sides as extending perpendicular to each other. And, each of the roller-receiving recesses $X_1$ and $X_2$ is provided with the first holding section L3 for holding the associated roller 2 vertical to the direction of movement of the roller and the roller 2 is maintained to be in contact with the first holding section L3 when it moves along the load and return sections 4c and 4b of the endless circulating path. The roller-receiving recess $X_1$ or $X_2$ also has a second holding section L1 which is inclined with respect to the first holding section L3 so that the associated roller 2 is maintained in position by this second holding section L1 as being inclined to maintain a predetermined positional relation between the two adjacent rollers 2 and 2 while the roller 2 is moving along the curved, connecting section 4a. Each of the roller-receiving recesses $X_1$ and $X_2$ is also provided with an intermediate holding section L2 which is a transitional region from the first to second holding section, and, thus, the roller 2 comes to be held by this intermediate holding section L2 when the roller moves between either of the load and return sections 4c and 4b and the curved, connecting section 4a. It should thus be clear that the first and second holding surfaces L3 and L1 are defined by a primary curved surface, or a semi-cylindrical surface in the illustrated embodiment and the intermediate holding section L2 is defined by a secondary curved surface, or a three-dimensionally varying surface.

It will be understood that the roller-receiving recess X is so formed in the separator 1 with its first holding surface L3 adjacent to the corresponding curved end surface 1a or 1a' and its second holding surface L2 adjacent to the corresponding flat surface 1b or 1b'. In the illustrated embodiment, the first holding surface L3 extends from the edge of the curved and surface 1a' to the center of the separator 1 and then the intermediate holding surface L2 extends to merge with the second holding surface L1.

Figure 4A:
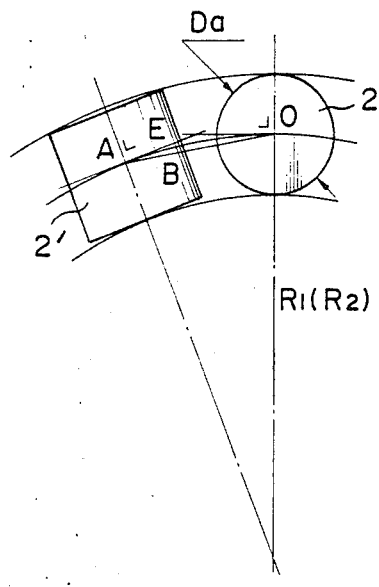
FIGS. 4a through 4c are schematic illustrations useful for explaining the principle of the present invention.

Now, the principle of the present invention will be described with particular reference to FIGS. 4a through 4c and 5a and 5b. FIG. 4a shows a situation in which two adjacent rollers 2 and 2' are located inside of the curved, connecting section of the endless circulating path. Since the two adjacent rollers 2 and 2' are in a crossed arrangement, the roller 2 is indicated by a circle and the following roller 2' is indicated by a square. The center of the roller 2 is indicated by O and the center of the following roller 2' is indicated by A. And, the straight line OA connecting between the two centers O and A intersects with a vertical sideline of the roller 2' and this is indicated by B. A straight line vertical to the straight line extending between the center of curvature of the curved, connecting section 4a and the center A of the roller 2' is drawn from the center A of the roller 2' and its point of intersection with the vertical side line of the roller 2' is indicated by E. The rollers 2 and 2' have a diameter indicated by Da.

Figure 4B:
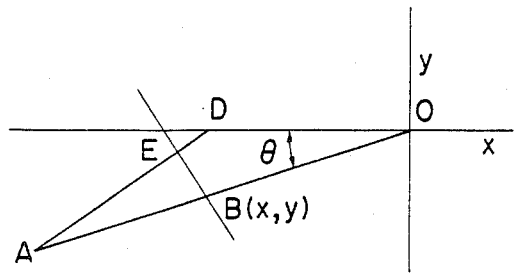

FIG. 4b is a schematic illustration which is an expanded view of the illustration shown in FIG. 4a, and the straight line extending through the point O and the center of curvature of the curved, connecting section 4a is taken as a y axis and the straight line vertical to the y axis and extending through the point O is taken as an x axis. And, the angle formed between the x axis and the line AO is defined as $\theta$. Under this condition, the position of point B in the x and y coordinate system is indicated by (x, y) and if the position (x, y) varies when the angle $\theta$ is varied between zero and $\theta$ while keeping the distance between A and O constant, there is obtained a curved line for the intermediate holding surface L2 of the separator 1. That is, $$\overline{OA} = \text{const.} = C$$

$$\overline{AB} = (Da/2) \times (1/\cos\theta)$$

$$\overline{OB} = SQRT(x^2 + y^2)$$

$$\cos\theta = SQRT(x^2)/SQRT(x^2+y^2)$$

Thus, we have the following relation from the above.

$$\overline{OA} = \overline{AB} + \overline{OB} \quad (I)$$
$$= (Da/2) \times SQRT(x^2 + y^2)/SQRT(x^2) + SQRT(x^2 + y^2)$$
$$= SQRT(x^2 + y^2) \times (Da/2SQRT(x^2) + 1)$$
$$x^2 + y^2 = (C/(Da/2SQRT(x^2) + 1))2$$
$$y = \pm SQRT(C^2/(Da/2SQRT(x^2) + 1)^2 - x^2)$$

Figure 5A:
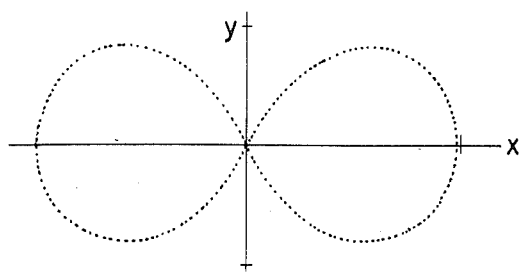
FIGS. 5a and 5b are graphs which are also useful for explaining the principle of the present invention.
Figure 5B:
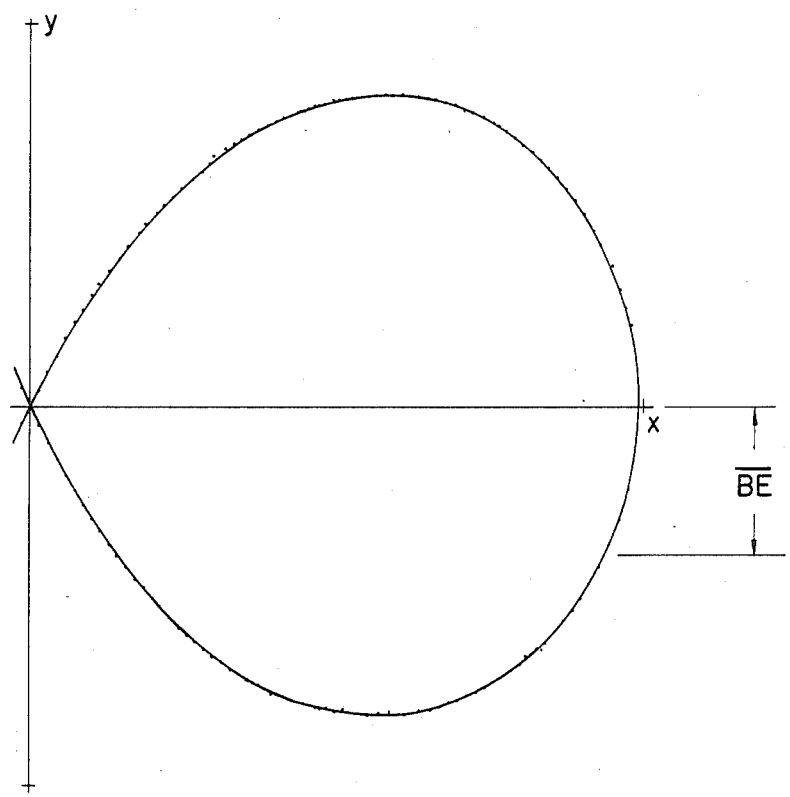

FIG. 5a is a graph which shows the plotting of the equation (1) in the x and y coordinate plane. FIG. 5b shows a half of the right-hand half of the curve shown in FIG. 5a and that part of the curve used for defining the intermediate holding surface L2 of the separator 1 is indicated by $\overline{BE}$.

It is to be noted that when the angle is at $\theta$, both of the rollers 2 and 2' on both sides of the separator 1 are located within the arcuate-shaped connecting section 4a at a predetermined radius of curvature. And, when the angle $\theta$ is zero, both of the rollers 2 and 2' on both sides of the separator 1 are located in either the load or return section 4c or 4b of the endless circulating path. On the other hand, when the angle between $\overline{AO}$ and the x axis takes a value between $\theta$ and zero, one of the rollers 2 and 2' on both sides of the separator 1 is located in the arcuate-shaped connecting section 4a and the other roller is located within either of the load and return sections 4c and 4b. Under this condition, if C is maintained constant at all times, there will be produced no fluctuations in the circumferential gap in the bearing assembly, and, thus, the sliding resistance may be minimized since factors, such as stick slip, which could otherwise increase the sliding resistance of the bearing assembly, can be eliminated.

Figure 4C:
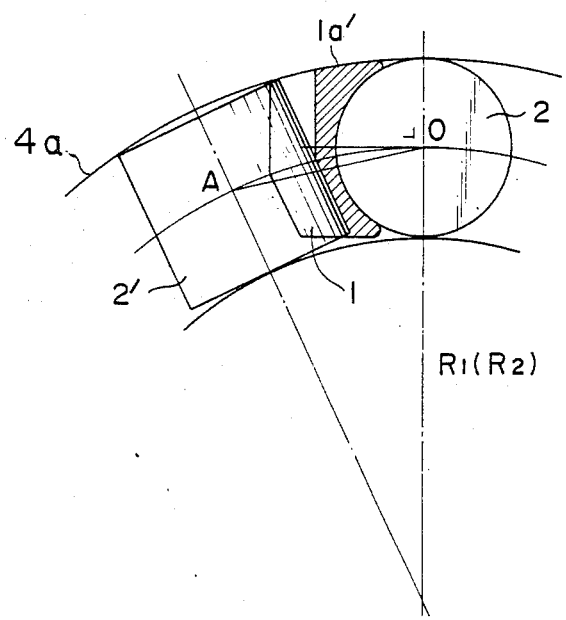

In FIG. 4c, it is shown how the separator 1 keeps the two adjacent rollers 2 and 2' in a predetermined positional relationship while the two rollers 2 and 2' are rolling along the arcuate-shaped connecting section 4a of the endless circulating path. In FIG. 4c, the separator 1 is shown as partly sectioned, and, thus, it can be seen that the roller 2' is held in contact with the second or inclined holding surface L1 of the trailing side roller-receiving recess of the separator 1. It is also shown in FIG. 4c that the separator 1 has its curved end surface 1a' in sliding contact with the outer guide surface of the curved, connecting section 4a of the endless circulating path with the opposite flat end surface slightly separated away from the inner guide surface of the curved, connecting section 4a. It should thus be apparent that the separator 1 moves along the curved, connecting section 4a as sliding along the outer guide surface of the section 4a.

Figure 6A:
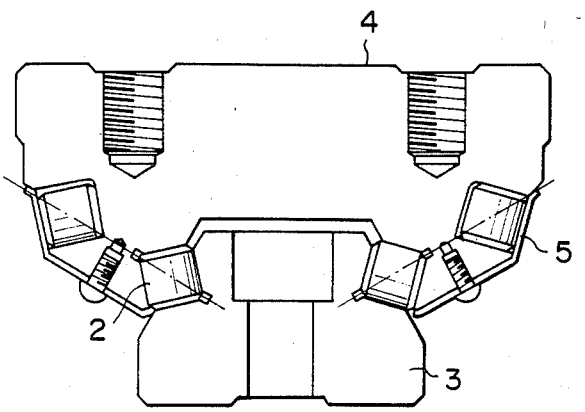
FIGS. 6a through 6c are schematic illustrations showing a crossed roller type linear motion rolling contact bearing assembly having roller separators constructed in accordance with another embodiment of the present invention.
Figure 6B:
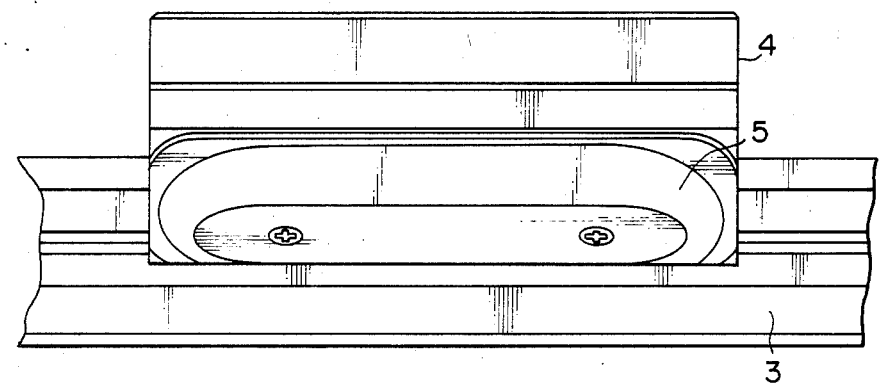
Figure 6C:
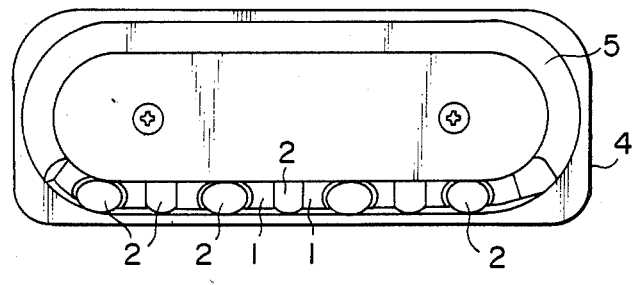

FIGS. 6a through 6c show a crossed roller type linear motion rolling contact bearing assembly constructed in accordance with another embodiment of the present invention. As shown, the present bearing assembly includes a rail 3 which extends straight over a predetermined length and which is provided with a pair of inclined side surfaces, each of which is formed with a V-shaped guide groove extending in parallel with the longitudinal centerline of the rail 3. The bearing assembly also includes a slider 4 which is provided with a pair of downwardly extending legs each of which is provided with an endless circulating path. Similarly with the previous embodiment, the endless circulating path is comprised of a straight load section defined between the oppositely arranged V-shaped guide grooves of the rail 3 and the slider 4, a straight return section, and a pair of curved, connecting sections, each of which connects the corresponding ends of the load and return sections. As shown in FIG. 6a, the load and return sections of the endless circulating path have a common diagonal plane as in the previous embodiment; however, in the present embodiment, the common diagonal plane indicated by the one-dotted line is inclined with respect to the horizontal plane.

The return section of the endless circulating path has its one side open to the exterior, but this side is sealed by a holder plate 5 which is fixedly attached to the slider 4 by means of screws. Thus, a plurality of rollers 2 may be maintained in the endless circulating path. It is to be noted that the rollers 2 are provided in the endless circulating path in a crossed arrangement, i.e., the two adjacent rollers 2 and 2 being oriented with their longitudinal axes extending perpendicular to each other and also to the direction of movement of the rollers 2 along the endless circulating path. As best shown in FIG. 6c, a plurality of separators 1 are also provided in the endless circulating path with each interposed between the two adjacent rollers 2 and 2. It is to be noted that the separator 1 shown in FIGS. 1 and 3a through 3c may be advantageously used in the present linear motion rolling contact bearing assembly.

Figure 7:
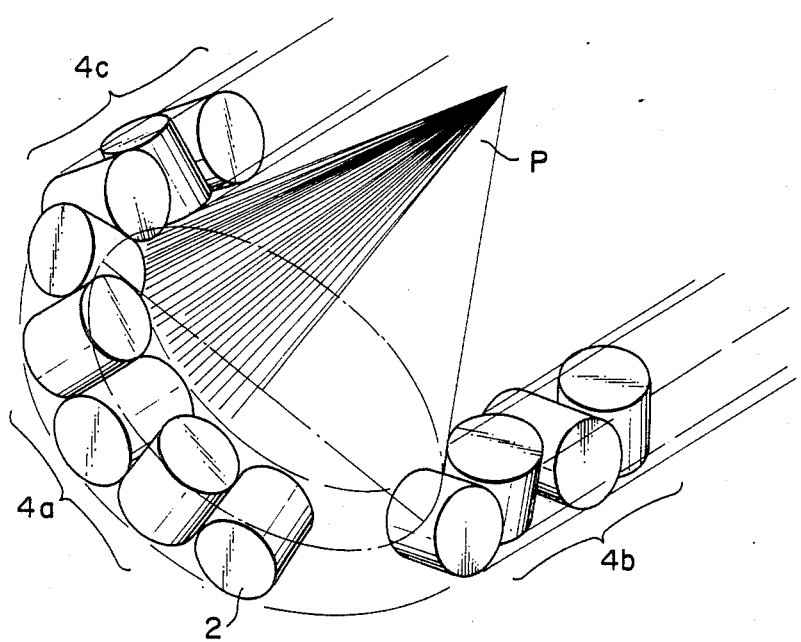
FIGS. 7 and 8 are schematic illustrations showing a crossed roller type linear motion rolling contact bearing assembly having roller separators constructed in accordance with a further embodiment of the present invention.
Figure 8:
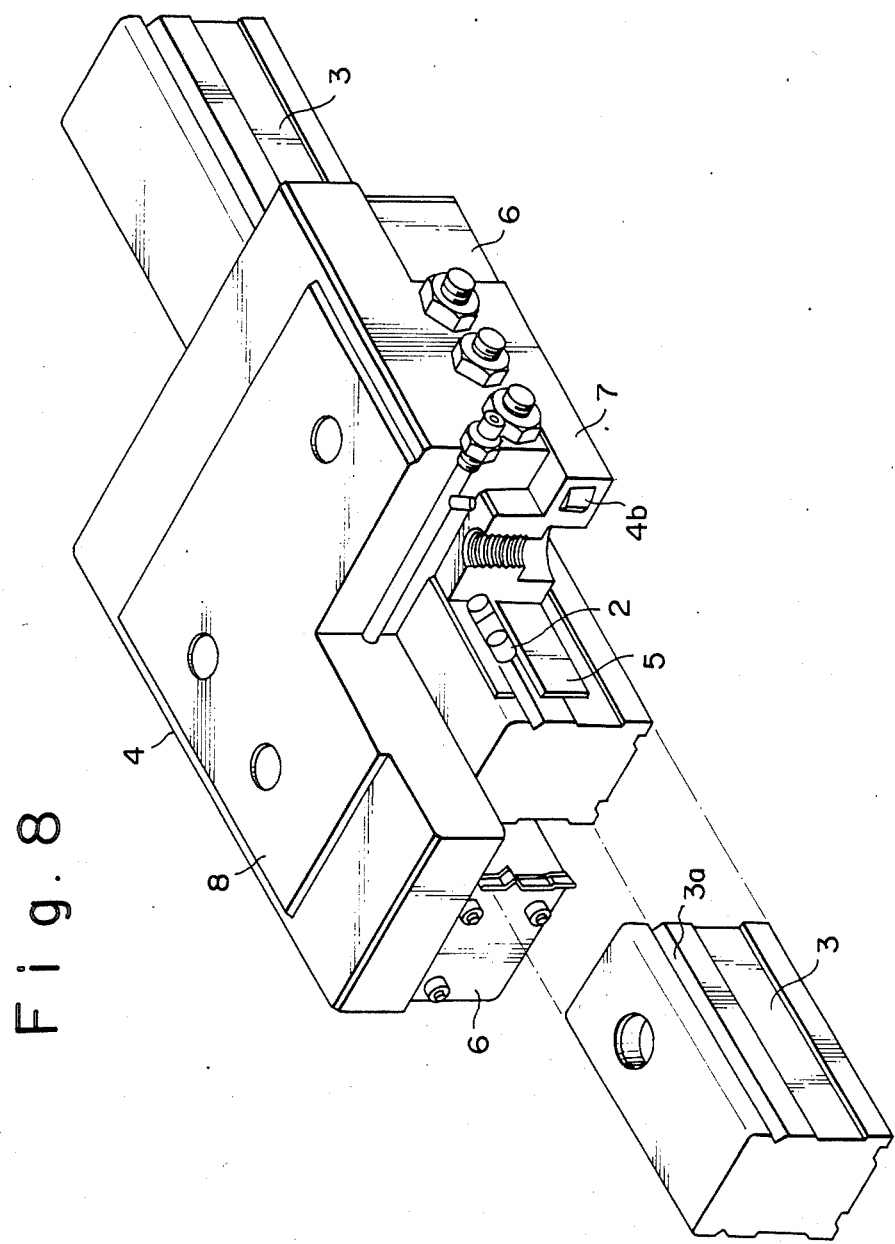

FIGS. 7 and 8 show a further crossed roller type linear motion rolling contact bearing assembly constructed in accordance with a further embodiment of the present invention. As shown in FIG. 8, the present bearing assembly is similar in structure to the previously described embodiments excepting that, in the present embodiment, the load and return sections of an endless circulating path do not have a common diagonal plane. That is, as shown in FIGS. 7 and 8, the connecting section 4a has a diagonal line extending approximately at 45° with respect to the horizontal plane, but the load section has a diagonal line extending approximately horizontally. Although no separators are shown in FIG. 7 for the purpose of brevity, it should be understood that separators 1 preferably of the structure shown in FIGS. 1 and 3a through 3c are provided in the endless circulating path with each interposed between the two adjacent rollers 2 in a crossed arrangement. FIG. 7 shows that either an upper or lower half of the arcuate-shaped connecting section 4a connecting the corresponding ends of the load and return sections 4c and 4b of the endless circulating path is, in fact, defined by part of the surface of a cone P.

The bearing assembly shown in FIG. 8 also includes a pair of front and rear end blocks 6 and 6 each of which is bolted to the front and rear ends of the slider 4, respectively. Each of the end blocks 6 and 6 is preferably formed with the arcuate-shaped connecting section 4a of the endless circulating path. Thus, in the present embodiment, the endless circulating path is completed when the pair of end blocks 6 and 6 are fixedly attached to the both ends of the slider 4. Also provided as fixedly attached to the slider 4 is a side block 7 at each side thereof, and side block 7 is formed with the return path section of the endless circulating path. In the embodiment shown in FIG. 8, a holder plate 5 for holding the rollers 2 in position in the load section of the endless circulating path is provided between the rail 3 and the slider 4. Also provided as fixedly attached to the slider 4 is a casing 8 at the top.

As described above, in accordance with the present invention, since the two adjacent rollers in rolling motion are prevented from coming into direct contact each other, the frictional force between the two adjacent rollers can be reduced significantly. Besides, the rollers may be maintained in a predetermined orientation at all times and thus skew may be prevented from occurring. In addition, the distance between the two adjacent rollers may be maintained constant at all times within the endless circulating path, so that the level of stick slip can be reduced. As a result, the overall sliding resistance of the linear motion bearing assembly can be minimized.

While the above provides a full and complete disclosure of the preferred embodiments of the present invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. A linear motion rolling contact bearing assembly, comprising:

first member extending straight over a predetermined distance;

second member mounted on said first member slidably along said first member;

an endless path having a first section defined between said first and second members and a second section defined in said second member having both ends connected to corresponding ends of said first section;

a plurality of rollers provided in said endless path, whereby a rolling contact is provided between said first and second members by those rollers located in said first section; and a plurality of roller separators each of which is interposed between two adjacent ones of said plurality of rollers, each of said separators being provided with a pair of roller-receiving recesses one on each of opposite sides thereof, each of said pair of roller-receiving recesses being capable of holding an associated roller in different orientations depending on the location along said endless circulating path.

2. The assembly of claim 1 wherein said roller-receiving recess has a first holding surface for holding said associated roller in a first orientation and a second holding surface for holding said associated roller in a second orientation which is different from said first orientation.

3. The assembly of claim 2 wherein said roller-receiving recess also has a third holding surface defined between said first and second holding surfaces as a transitional zone for varying the orientation of said associated roller between said first and second orientations.

4. The assembly of claim 3 wherein said first section of said endless path is a straight load section and said second section of said endless path includes a straight return section extending in parallel with said straight load section and a pair of arcuate-shaped connecting sections each connecting corresponding ends of said straight load and return sections, whereby said rollers on both sides of the associated separator are set in said first orientation while said rollers are both located in said load or return section, in said second orientation while both of said rollers are located in said arcuate-shaped connecting sections, and between said first and second orientations while one of said rollers is located in either of said load or return section and the other of said rollers is located in one of said pair of arcuate-shaped connecting section.

5. The assembly of claim 3 wherein said first and second holding surfaces are semi-cylindrical in shape and said third holding surface is a three-dimensionally varying curved surface.

6. The assembly of claim 3 wherein said pair of oppositely arranged roller-receiving recesses are formed with their longitudinal directions extending perpendicular to each other, thereby holding said rollers in a crossed arrangement with their longitudinal axes extending perpendicular to each other.

* * * * *